United States Patent
Zhu et al.

(10) Patent No.: US 7,714,583 B2
(45) Date of Patent: May 11, 2010

(54) POWER SUPPLY FOR SUPPLYING MULTI-CHANNEL, STABLE, ISOLATED DC POWER AND METHOD OF MAKING SAME

(75) Inventors: Pengcheng Zhu, ShangHai (CN); Juan Antonio Sabate, Gansevoort, NY (US); Yunfeng Liu, Pudong Area (CN)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/138,773

(22) Filed: Jun. 13, 2008

(65) Prior Publication Data

US 2009/0309598 A1 Dec. 17, 2009

(51) Int. Cl.
*G01V 3/00* (2006.01)
(52) U.S. Cl. ...................... 324/322; 324/318
(58) Field of Classification Search .......... 324/300–322
See application file for complete search history.

(56) References Cited

U.S. PATENT DOCUMENTS

| | | | |
|---|---|---|---|
| 2,995,698 A * | 8/1961 | Collins | 324/314 |
| 4,343,034 A * | 8/1982 | Wells et al. | 363/82 |
| 4,437,053 A | 3/1984 | Bax | |
| 5,270,657 A | 12/1993 | Wirth et al. | |
| 5,370,680 A * | 12/1994 | Proctor | 607/154 |
| 5,734,256 A | 3/1998 | Larsen et al. | |
| 5,999,179 A | 12/1999 | Kekic et al. | |
| 6,178,102 B1 * | 1/2001 | Stanley | 363/44 |
| 6,323,649 B1 | 11/2001 | Pace et al. | |
| 6,949,915 B2 * | 9/2005 | Stanley | 323/207 |
| 7,091,632 B2 * | 8/2006 | Lenz | 307/102 |
| 7,403,400 B2 * | 7/2008 | Stanley | 363/16 |
| 2006/0015222 A1 | 1/2006 | Payton et al. | |

FOREIGN PATENT DOCUMENTS

WO WO0016471 A1 3/2000
WO WO03007011 A1 1/2003

OTHER PUBLICATIONS

Fujita et al., "An Approach to Harmonic Current-Free AC/DC Power Conversion for Large Industrial Loads: The Integration of a Series Active Filter with a Double-Series Diode Rectifier," IEEE Transactions On Industry Applications, vol. 33, No. 5, Sep./Oct. 1997, pp. 1233-1240.

Roux et al., "Digital Control of an Integrated Series Active Filter and Passive Rectifier with Voltage Regulation," IEEE, 2002, pp. 68-73.

* cited by examiner

*Primary Examiner*—Brij B Shrivastav
*Assistant Examiner*—Dixomara Vargas
(74) *Attorney, Agent, or Firm*—Scott J. Asmus

(57) ABSTRACT

A power supply having an input, wherein the power supply includes a multi-winding transformer having an input and a plurality of outputs, and a plurality of rectifiers to provide a plurality of DC output voltages, wherein each rectifier is coupled to an output of the multi-winding transformer. The power supply further includes a regulator circuit coupled between the transformer input and one of the transformer outputs, and configured to regulate an input voltage to the multi-winding transformer to minimize a variance of each rectifier DC output voltage.

17 Claims, 7 Drawing Sheets

FIG. 2
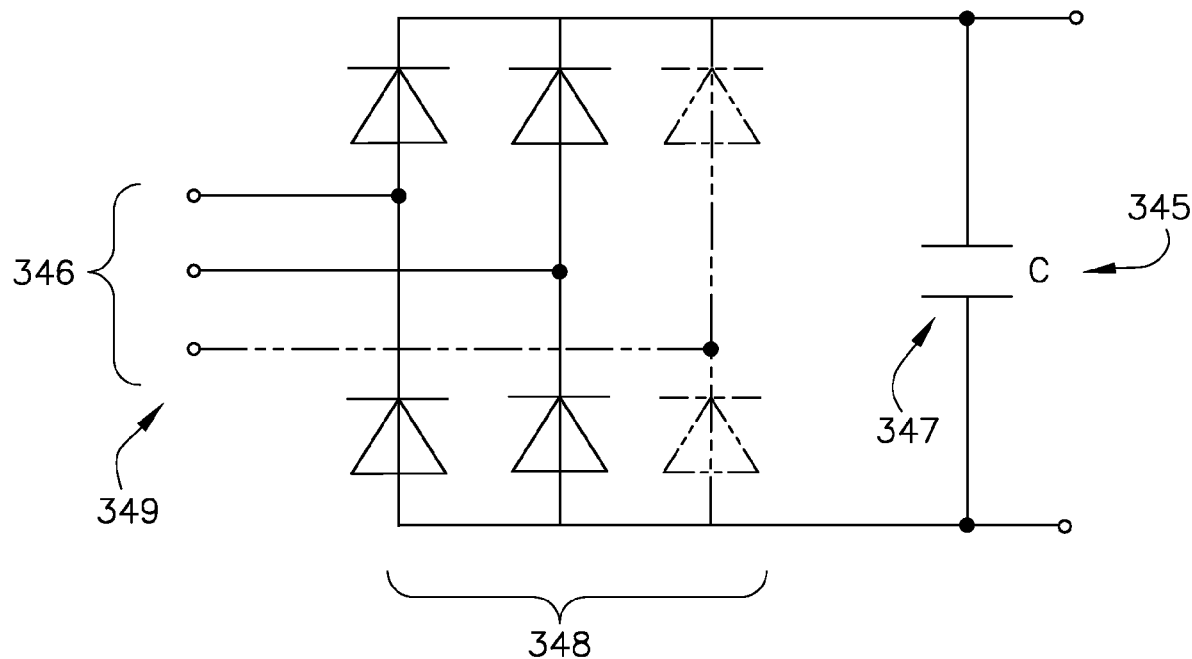
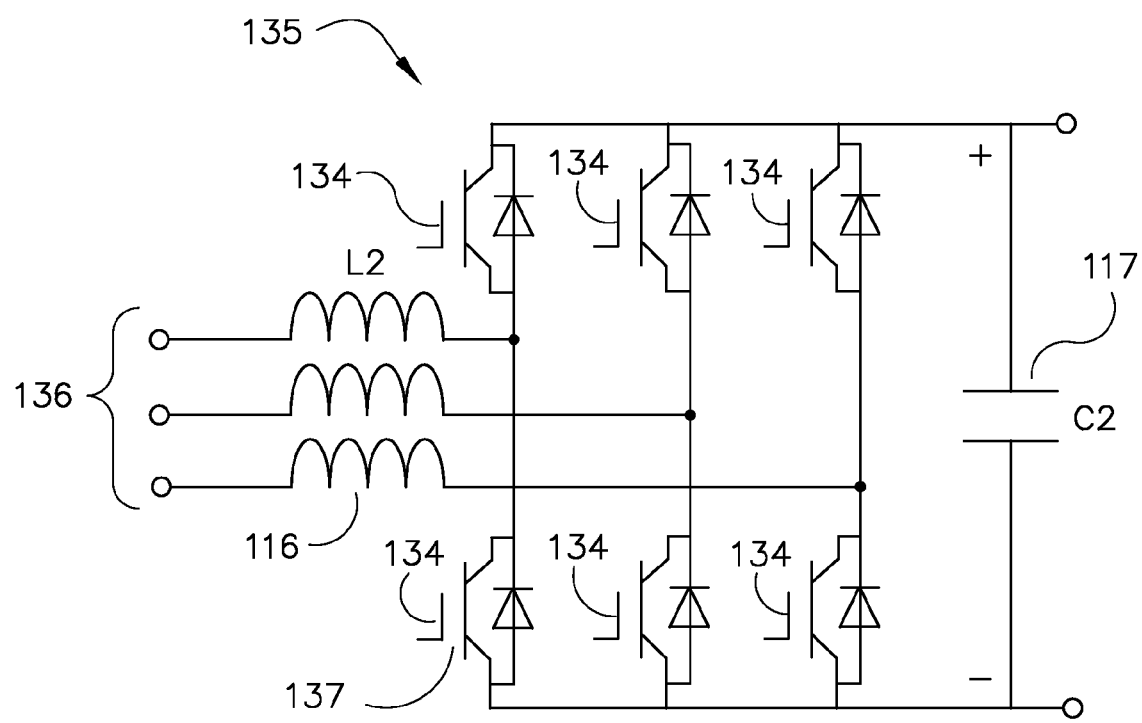
FIG. 3

FIG. 7
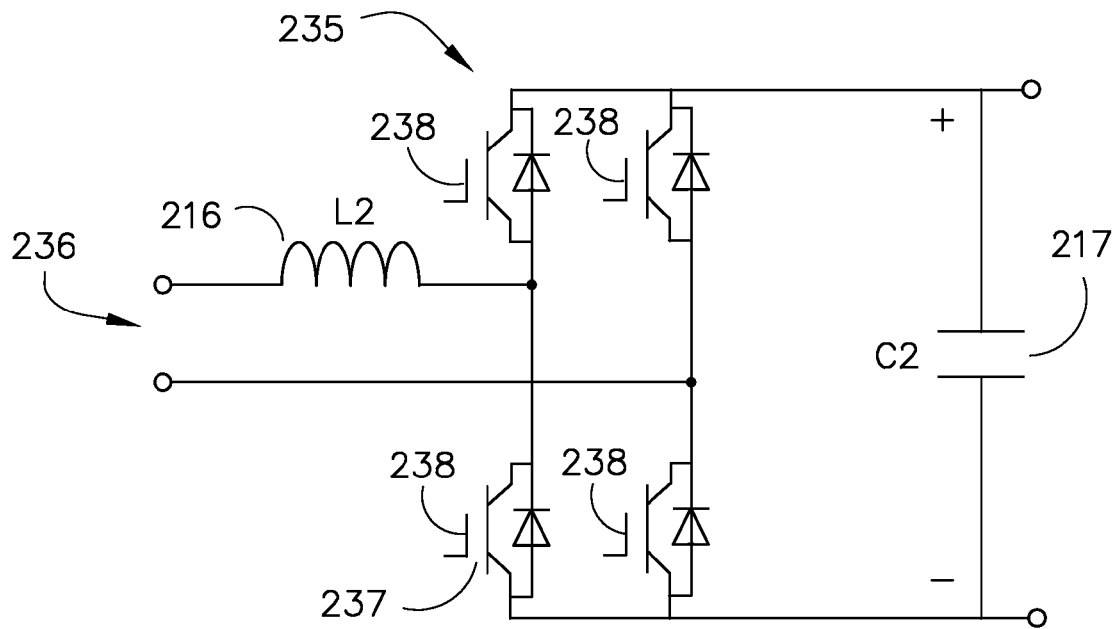
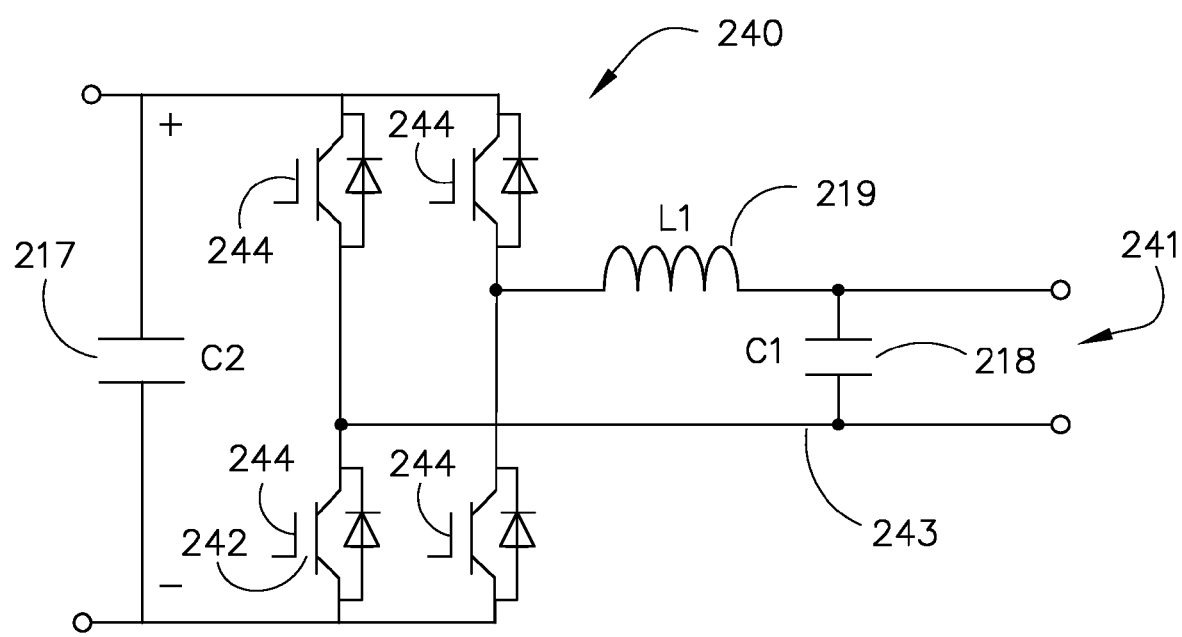
FIG. 8

US 7,714,583 B2

POWER SUPPLY FOR SUPPLYING MULTI-CHANNEL, STABLE, ISOLATED DC POWER AND METHOD OF MAKING SAME

BACKGROUND OF THE INVENTION

Embodiments of the invention relate generally to power supplies and, more particularly, to an apparatus for supplying multi-channel, isolated, and stable DC power. While embodiments of the invention may be described with respect to a magnetic resonant imaging system, one skilled in the art will recognize that the invention may be used in any device where multiple channels of isolated, stable DC power is desired.

When a substance such as human tissue is subjected to a uniform magnetic field (polarizing field $B_0$), the individual magnetic moments of the spins in the tissue attempt to align with this polarizing field, but precess about it in random order at their characteristic Larmor frequency. If the substance, or tissue, is subjected to a magnetic field (excitation field $B_1$) which is in the x-y plane and which is near the Larmor frequency, the net aligned moment, or "longitudinal magnetization", $M_z$, may be rotated, or "tipped", into the x-y plane to produce a net transverse magnetic moment $M_t$. A signal is emitted by the excited spins after the excitation signal $B_1$ is terminated and this signal may be received and processed to form an image.

When utilizing these signals to produce images, magnetic field gradients ($G_x$, $G_y$, and $G_z$) are employed. Typically, the region to be imaged is scanned by a sequence of measurement cycles in which these gradients vary according to the particular localization method being used. The resulting set of received NMR signals are digitized and processed to reconstruct the image using one of many well known reconstruction techniques.

Typically, the magnetic field gradients $G_x$, $G_y$ and $G_z$ are generated by three separate gradient coils, respectively. Each coil is driven by a gradient amplifier, whose power output determines the peak amplitude and slew rate of the magnetic gradient. The peak amplitude primarily affects image resolution, while the slew rate most affects image acquisition time.

Gradient amplifiers comprise a major portion of the total cost of an MR imaging system. Typically, MR imaging systems have three gradient amplifiers, one for each axis in the Cartesian coordinate system (i.e. x, y, and z). Each gradient amplifier typically uses several galvanically isolated DC power supplies. For example, a typical MR imaging system may have 12 isolated DC channels supplying power to the gradient amplifiers. As the size of gradient amplifiers increase to provide improved imaging functionality, the size and cost of DC power supplies for those amplifiers also increase.

In a typical MR imaging system, the multiple DC channels needed to provide power for the operation of gradient amplifiers are typically supplied by DC-to-DC resonant converters or some combination of rectifiers and buck converters. For DC-to-DC resonant converters, a separate resonant converter is used for each DC channel. Isolation of the output from the input typically calls for a transformer to be added to each resonant converter. While it is possible for some resonant converter circuits to share a transformer, the 12 DC channels in a typical MR imaging system may result in multiple transformers in the system power supply. Also, for high-voltage operation, resonant converters use specialized components increasing the cost of the system. Resonant converters, which operate at high frequencies, include switches and rectifier diodes capable of handling elevated power levels at high frequencies, making the components more difficult to manufacture, and therefore more expensive. Similarly, the high-frequency transformers needed to operate resonant converters are also expensive and difficult to manufacture.

Buck converters, which typically use PWM-switching to modulate DC voltage input levels to the desired DC output level, also have some disadvantages with regard to size and cost. Like resonant converters, buck converters require a transformer to isolate the output from the input. A typical MR imaging system with 12 buck converters may have a number of transformers for power supply isolation. Additionally, each buck regulator may require an unregulated rectifier to convert the AC input into a DC input for the buck converter, an IGBT/Diode, and an inductor for proper operation of each buck regulator. For a typical MR imaging system using buck converters or resonant converters to supply DC power to its gradient amplifiers, the size, complexity, and cost of those power supplies increase significantly with the number of DC channels provided.

One of the factors that determine the size and cost of power supply components is their power rating, which indicates the maximum power that can safely flow through the device. To the extent that a power supply can be designed to minimize the required power ratings of its components, the material costs required to construct such a power supply are reduced. Another factor influencing component cost is the range of frequency operation. In general, components designed to operate at high frequencies are more costly than components designed to operate at lower frequencies.

It would therefore be desirable to have an apparatus to supply multiple channels of stable, isolated DC power in a cost effective manner.

BRIEF DESCRIPTION OF THE INVENTION

According to one aspect of the invention, a power supply having an input, wherein the power supply includes a multi-winding transformer having an input and a plurality of outputs, and a plurality of rectifiers to provide a plurality of DC output voltages, wherein each rectifier is coupled to an output of the multi-winding transformer. The power supply further includes a regulator circuit coupled between the transformer input and one of the transformer outputs, and configured to regulate an input voltage to the multi-winding transformer to minimize a variance of each rectifier DC output voltage.

In accordance with another aspect of the invention, an MRI apparatus includes a magnetic resonance imaging (MRI) system having a plurality of gradient coils positioned about a bore of a magnet, a plurality of gradient amplifiers, an RF transceiver system, an RF switch controlled by a pulse module to transmit RF signals to an RF coil assembly to acquire MR images, and a DC power supply having an input and coupled to the plurality of gradient amplifiers. The power supply includes a transformer having a primary winding and a plurality of secondary windings, and a rectifier array coupled to at least a portion of the plurality of secondary windings and configured to provide a plurality of DC outputs therefrom. The power supply further includes a control circuit electrically coupled between the primary winding and one of the secondary windings, and configured to regulate an input voltage to the primary winding to minimize a variance of each DC output.

Yet another aspect of the invention includes a method of manufacturing a power supply which includes providing a connection and electrical line for an AC input, coupling the AC input to a multi-winding transformer having a plurality of outputs, and assembling a plurality of rectifiers to the multi-winding transformer wherein each rectifier is coupled to an output of the multi-winding transformer. The method further includes assembling a regulator circuit coupled to one of the transformer outputs, and coupling the regulator circuit to the electrical line for the AC input.

Various other features and advantages will be made apparent from the following detailed description and the drawings.

BRIEF DESCRIPTION OF THE DRAWINGS

The drawings illustrate embodiments presently contemplated for carrying out the invention.

In the drawings:

FIG. 2 is a schematic diagram of a single-phase and three-phase unregulated rectifier useable in the circuits of FIGS. 1 and 6.

FIG. 3 is a schematic diagram of a three-phase active rectifier useable in the circuit of FIG. 1.

FIG. 7 is a schematic diagram of a single-phase active rectifier useable in the circuit of FIG. 6.

FIG. 8 is a schematic diagram of a single-phase PWM inverter useable in the circuit of FIG. 6.

DETAILED DESCRIPTION OF THE PREFERRED EMBODIMENT

Figure 1:
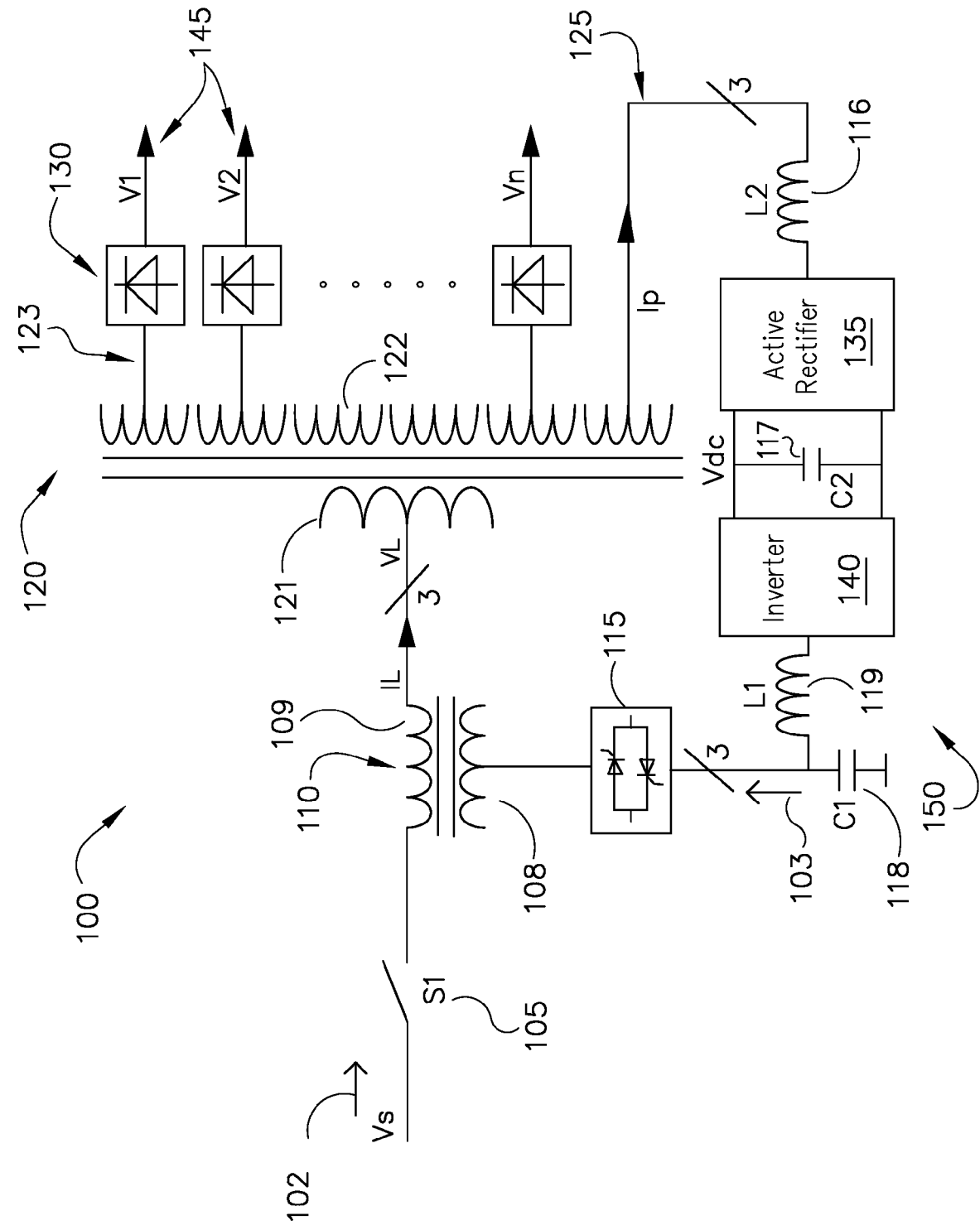
FIG. 1 is a schematic diagram of a three-phase isolated power supply according to an embodiment of the invention.

FIG. 1 illustrates a schematic diagram of an isolated power supply 100 according to one embodiment of the invention. Power supply 100 will be described herein as a three-phase power supply. Power supply 100 has a three-phase AC input 102 configured to be coupled to unregulated three-phase AC power. A switch 105 connects or disconnects the AC input 102, as necessary, to a transformer 110 coupled thereto. A winding, such as a secondary winding 109 of transformer 110, is also coupled to a primary winding 121 of a multi-winding transformer 120. As will be described herein below, transformer 110 provides isolation for a pre-regulator, or control, circuit 150 from the AC input 102.

Multi-winding transformer 120 has a plurality of secondary windings 122, hence the term multi-winding transformer. The plurality of secondary windings 122 of multi-winding transformer 120 have a plurality of outputs 123 coupled to a plurality of unregulated rectifiers 130. FIG. 2 shows an exemplary schematic diagram of an unregulated rectifier 345 connectable to an output 125 of the multi-winding transformer 120 of FIG. 1. Rectifier 345 includes three input lines 346 and 349 (shown in phantom) for each phase of a three-phase voltage signal. The three-phase voltage signal is supplied to a diode bridge 348 and 350 (shown in phantom) having six diodes configured to rectify the three-phase voltage signal into a DC voltage signal. The DC signal from the diode bridge 348 and 350 is further regulated by a capacitor 347 to reduce ripple.

Referring back to FIG. 1, unregulated rectifiers 130 are configured to supply stable, isolated DC outputs 145. In one embodiment of the invention, such as when used in MR imaging systems, for example, twelve DC outputs 145 feed three gradient amplifiers. However, one skilled in the art will recognize that embodiments of the invention are not limited to twelve DC outputs 145.

A pre-regulator, or feedback, circuit 150 is coupled between an output 125 of secondary windings 122 of multi-winding transformer 120 and a winding, such as a primary winding 108 of transformer 110. Pre-regulator circuit 150 is configured to supply a compensating voltage to the unregulated AC power received via AC input 102 to minimize variance of the unregulated AC power to the multi-winding transformer 120. By minimizing the variation of the transformer 120 input voltage, the variation of the voltage at each transformer output 123 is also minimized. Accordingly, power supply 100 may be configured to use unregulated rectifiers 130 to supply a plurality of stable DC outputs 145.

Pre-regulator circuit 150 includes an active rectifier 135 coupled to output 125 through an inductor 116 acting as a low-pass filter. In another embodiment, rather than being a discrete component, inductor 116 may represent the leakage inductance from the multi-winding transformer 120. FIG. 3 illustrates an exemplary schematic diagram of the three-phase active rectifier 135 of FIG. 1. One skilled in the art, however, will recognize that a different rectifier circuit may also be used to rectify the three-phase voltage from output 125. Rectifier 135 has three inputs 136, one for each phase of the three-phase AC voltage supplied thereto. Each phase of the AC voltage input into rectifier 135 passes through one of three inductors 116, which filter out high-frequency components of the input signal. For simplification, FIG. 1 depicts only inductor 116. As shown in FIG. 3, inductors 116 are coupled to six transistors 137 in a bridge circuit configuration. Modulation of gate voltage to gates 134 of transistors 137 allows modulation of the DC output voltage level. The rectified DC signal from transistors 137 is further regulated by a capacitor 117 (also shown in FIG. 1) to reduce ripple.

Referring back to FIG. 1, the rectified DC signal across capacitor 117 is supplied to a pulse-width modulated (PWM) inverter 140. PWM switching is a method of delivering electrical power to a load based on modulation of a pulse such as a square wave. By modulating the duty cycle of a series of pulses, it is possible to control the average power of a signal. Typically, a series of pulses can be generated by rapidly opening and closing a switch, such as a transistor, or a number of switches through which a DC signal is delivered to a load. By rapidly modulating the duty cycle of the pulses, average power to the load can be made to mimic an AC signal. When the frequency of the pulses is sufficiently high, the signal can be used to drive the load such as a motor, for example, as effectively as a continuous analog signal. However, it is also possible through the use of passive filters to recover a continuous electronic signal from the pulsed square waves. The advantage of PWM switching is that the switch, or transistor, is either fully open or completely closed. This translates into the transistor being operated in the saturation region (switch open), or in the cutoff region (switch closed). The transistor consumes little or no power when operating in these regions. By comparison, a transistor that is used to directly control the power level of a continuous signal could function primarily in the linear operating region, consuming considerably more power than when operating in saturation or cutoff.

One common method used in PWM switching devices for modulating square waves involves the use of two signals, a sine wave reference signal superimposed on a triangle (sawtooth) wave. The two signals serve as inputs to a comparator whose output drives one of the transistors (switches) in the circuit. When the magnitude of the triangle wave is above the magnitude of the sine wave, the comparator generates a high output, and when the magnitude of the triangle wave is below the magnitude of the sine wave, the comparator generates a low output. An inverter such as inverter 140 that is designed for a three-phase AC input may use three sine wave reference signals. Thus, it is possible to produce three AC outputs whose frequency depends on the frequency of the reference signals, and whose amplitude depends on the amplitude of the reference signals. According to an embodiment of the invention, inverter 140 may be modulated by modulating the amplitude and/or frequency of the reference signals.

Figure 4:
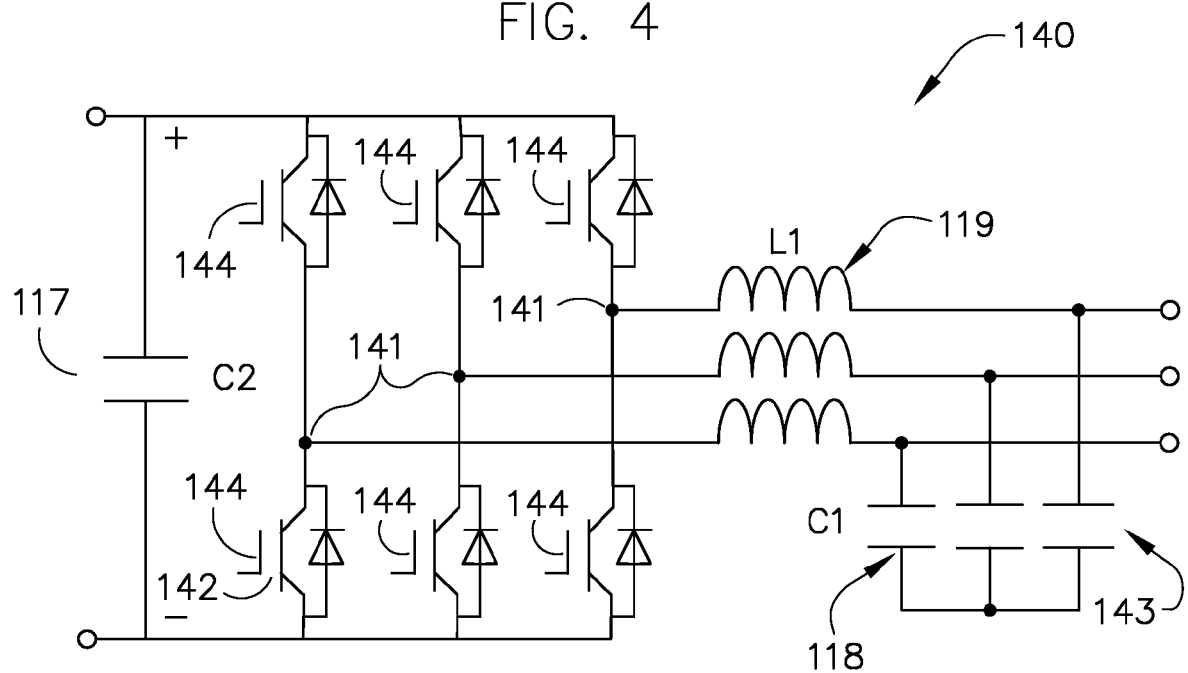
FIG. 4 is a schematic diagram of a three-phase PWM inverter useable in the circuit of FIG. 1.

FIG. 4 illustrates an exemplary schematic diagram of the three-phase PWM inverter 140 shown in FIG. 1. One skilled in the art, however, will recognize that a different PWM inverter circuit may also be used. According to an embodiment of the invention, the rectified DC signal across capacitor 117 is input into six transistors 142 of inverter 140. Transistors 142 each have a gate 144 modulated or controlled by reference signals as described above, for example, by switching frequency of the signals applied thereto. Three inverter outputs 141 supply three-phase compensation voltages that are each passed through a respective low-pass filter 143 having three inductors 119 and three capacitors 118 for the three inverter outputs 141. For simplification, FIG. 1 depicts only one inductor 119 and one capacitor 118 for the low-pass filter 143.

Referring again to FIG. 1, the control algorithm for inverter 140 ensures that the correct compensation voltage is supplies to AC input voltage 102. The algorithm triggers a comparison of AC input 102 voltage, Vs, to a reference value, Vref, which is in phase with Vs and has a fixed, normal amplitude. This comparison leads to the generation of a reference signal, Vcomp, for inverter output voltage 103. Inverter 140 compares Vcomp with inverter output voltage 103 to calculate an error. Using this error as an input, a regulator, such as a proportional-integral regulator, generates the signals for PWM operation of the transistors 144 in FIG. 4 to zero the error. The inverter output voltage 103 will then be the same as Vcomp. This voltage is coupled into the input voltage 102 through transformer 110. Since Vcomp is equal to the voltage variation Vref-Vs, VL is maintained as Vref despite variations in Vs.

Figure 5:
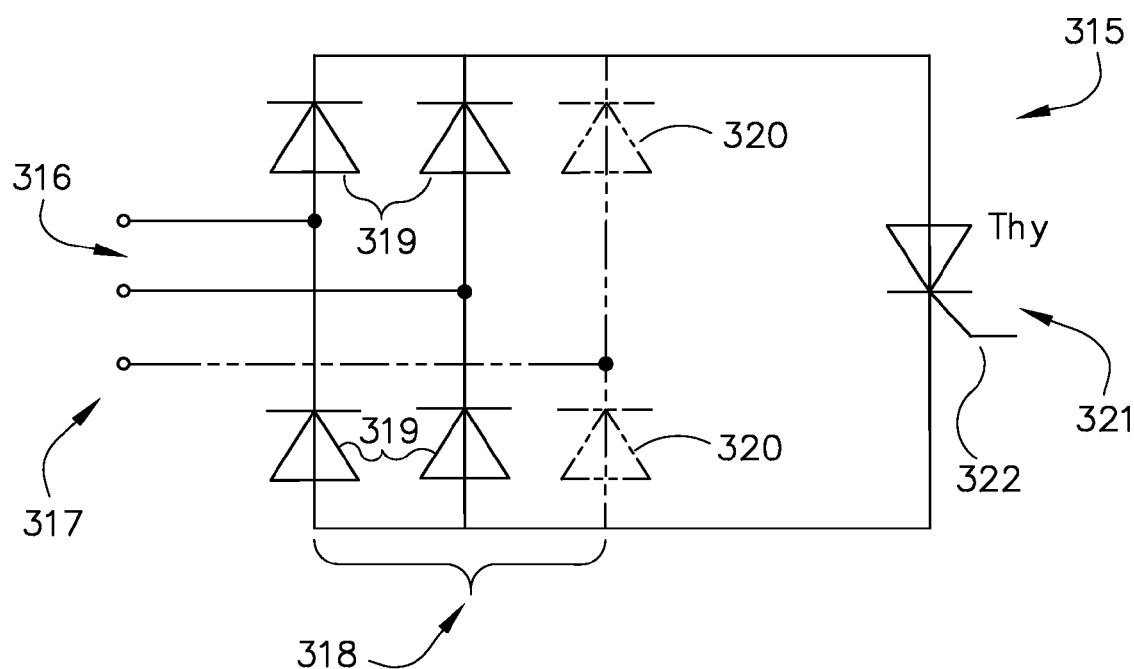
FIG. 5 is a schematic diagram of a single-phase and three-phase bypass protection circuit useable in the circuits of FIGS. 1 and 6.

A low-pass-filtered compensating voltage signal 103 supplied by low-pass filter 143 passes to a bypass protection circuit 115. FIG. 5 illustrates an exemplary schematic diagram of a bypass protection circuit 315 usable for the bypass protection circuit 115 of FIG. 1. Circuit 315 includes three inputs 316 and 317 (shown in phantom) connected to a diode bridge 318 having six diodes 319 and 320 (shown in phantom) configured to supply a DC voltage to a thyristor 321. However, when the thyristor is not turned on, or triggered, no current flows in the bypass protection circuit. Thyristor 321 includes a gate 322 to control the operating state of thyristor 321. The three inputs 316 are connected in parallel with the three electrical lines running from the inverter 140 of FIG. 1 through low-pass filter 143 of FIG. 1 to the primary winding 108 of FIG. 1 of transformer 110 of FIG. 1. When the inverter 140 output current, or the DC bus voltage, exceeds some threshold value, the thyristor 321 will be triggered. When the thyristor 321 is turned on, the primary winding 108 of transformer 110 is short-circuited and the current in inverter 140 and rectifier 135 is shut off. As the inverter output current 103 goes to zero, the AC input of transformer 120, VL, is the same as AC input 102 Vs. Thus, triggering of thyristor 321 will effectively disconnect inverter 140 of FIG. 1 from the power supply circuit 100 in FIG. 1.

Figure 6:
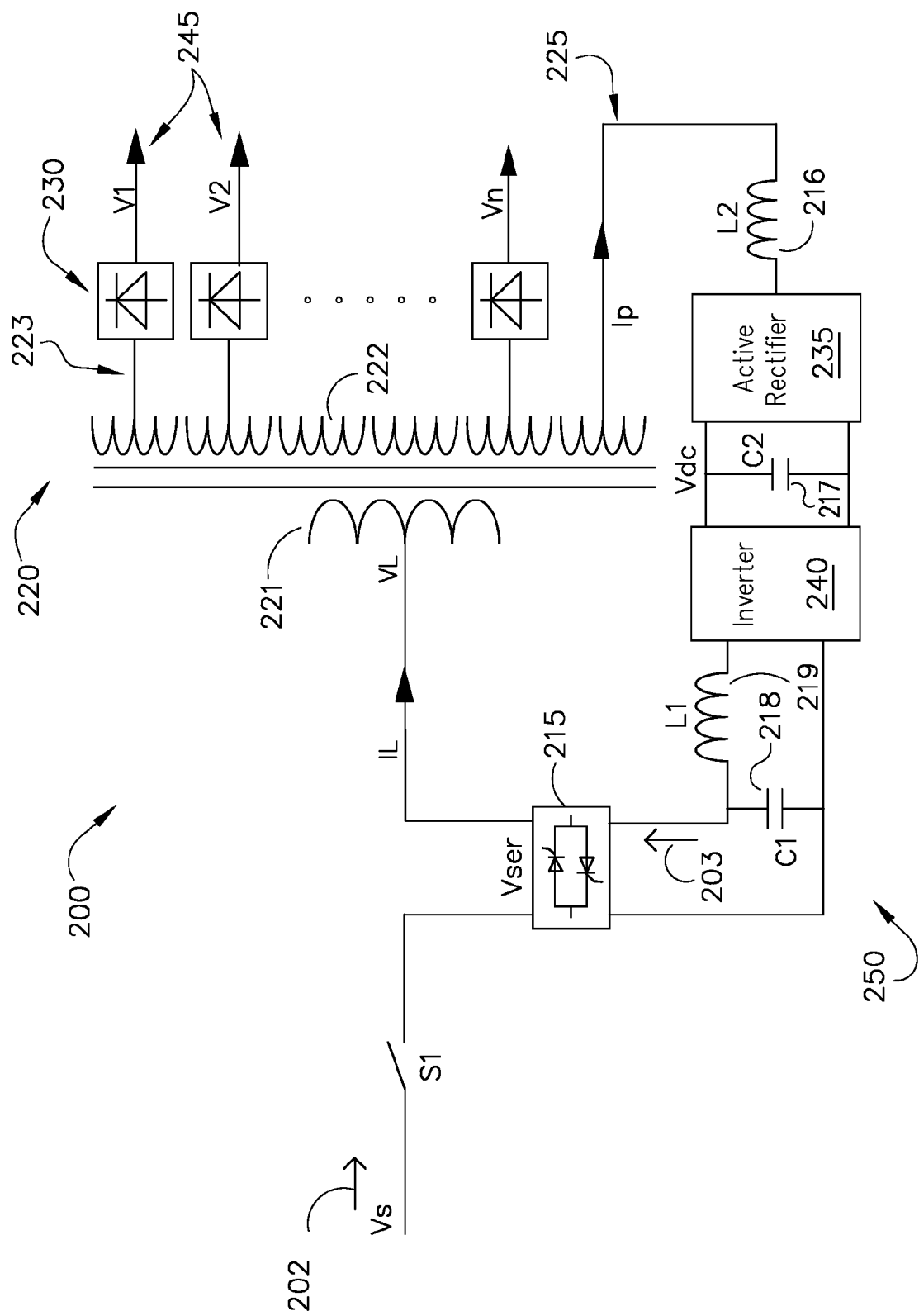
FIG. 6 is a schematic diagram of a single-phase power supply according to an embodiment of the invention.

FIG. 1 as described above illustrates an embodiment of an isolated power supply 100. That is, transformer 110 isolates inverter 140 and active rectifier 135 of feedback circuit 150 from the unregulated AC power supplied to primary winding 121 of transformer 120. For example, in the event that either the inverter 140 or the active rectifier 135 short to ground, the isolation from the unregulated AC power will limit the amount of electrical current drawn from AC input 102 through the shorted components. However, for applications that don't require an isolated power supply, FIG. 6 shows an embodiment of the invention of a non-isolating power supply 200 having no isolating transformer. Power supply 200 will be described herein as a single-phase power supply. Power supply 200 has a single-phase AC input 202 configured to receive unregulated single-phase AC power and configured to be serially coupled to a primary winding 221 of a multi-winding transformer 220. A secondary winding 222 of multi-winding transformer 220 has a plurality of outputs 223 coupled to a plurality of unregulated rectifiers 230.

FIG. 2 shows an example of an unregulated rectifier 345 connectable to an output 225 of the multi-winding transformer 220 of FIG. 6. For single-phase voltage regulation, only the two input lines 346 receive input signals from output 225 of the multi-winding transformer 220 of FIG. 6. Rectification of the AC signal is accomplished by diode bridge 348 having four diodes. As described above, the DC signal from the diode bridge 348 is further regulated by capacitor 347 to reduce ripple.

Referring back to FIG. 6, one output 225 from the multi-winding transformer 220 feeds into an active rectifier 235 of a pre-regulator circuit 250 through an inductor 216 acting as a low-pass filter. In another embodiment, the inductor 216 can be effectively replaced by leakage inductance from the multi-winding transformer 220.

FIG. 7 shows an exemplary schematic diagram of the single-phase active rectifier 235 of FIG. 6. Rectifier 235 has two input lines 236, one for the single-phase AC input and one for a neutral line. A single inductor 216 is configured to filter out high-frequency components of the input signal. The input and neutral lines 236 connect to four transistors 237 in a bridge circuit configuration. Each transistor 237 has a gate 238 to which modulation of a gate voltage thereto allows modulation of the DC output voltage level. The rectified DC signal from transistors 237 is further regulated by a capacitor 217 (also shown in FIG. 6) to reduce ripple.

Referring again to FIG. 6, the rectified DC signal across capacitor 217 is supplied to a PWM inverter 240. FIG. 8 shows an exemplary schematic diagram of the single-phase PWM inverter 240 of FIG. 6. According to an embodiment of the invention, the rectified DC signal across capacitor 217 is input into four transistors 242 in FIG. 8 of inverter 240. Transistors 242 in FIG. 8 each have a gate 244 in FIG. 8 modulated or controlled by reference signals as described above, for example, by switching frequency of the signals applied thereto. A single inverter output 241 in FIG. 8 supplies a single-phase compensation voltage to a low-pass LC filter 243 in FIG. 8 having a capacitor 218 and an inductor 219. As shown in FIG. 6, low-pass-filtered signal 203 passes to a bypass protection circuit 215, after which, the signal is coupled to the unregulated single-phase AC power.

FIG. 5 illustrates an exemplary schematic diagram of a bypass protection circuit 315 usable for the bypass protection circuit 215 of FIG. 6. Circuit 315 includes two inputs 316 connected to a diode bridge 318 having four diodes 319 configured to supply a DC voltage to a thyristor 321. FIG. 6 shows two lines (one carrying AC input 202, the other carrying inverter output 203) connected to the bypass protection circuit 215. Each of those two lines is connected to one of inputs 316 of bypass protection circuit 315. Thyristor 321 includes a gate 322 controlling the operating state of thyristor 321. Under normal conditions, the thyristor is not triggered. When the inverter output current 203, or the DC bus voltage, exceeds a threshold value, the thyristor 321 will be triggered. When the thyristor 321 is turned on, the AC input 202 in FIG. 6 is coupled directly to the primary winding 221 of transformer 220, and the inverter 240 in FIG. 6 is effectively disconnected from the power supply circuit 200 in FIG. 6.

Referring again to FIG. 6, a compensating voltage supplied by pre-regulator circuit 250 to the unregulated single-phase AC power received via AC input 202 is designed to minimize the variation of the voltage input into the multi-winding transformer 220. Minimizing the variation of input voltage into transformer 220 minimizes the variation of each of the output voltages on outputs 223 of the transformer 220. The stability of the input to the multi-winding transformer 220 thus allows for the use of unregulated rectifiers 230 to supply a plurality of stable DC outputs 245.

While power supplies 100, 200 have been described herein as three-phase and single-phase power supplies, respectively, it is contemplated that power supplies 100, 200 may be designed as single-phase and three-phase power supplies, respectively. Accordingly, it is contemplated that the appropriate phase embodiments described above may be interchanged between power supplies 100 and 200.

Figure 9:
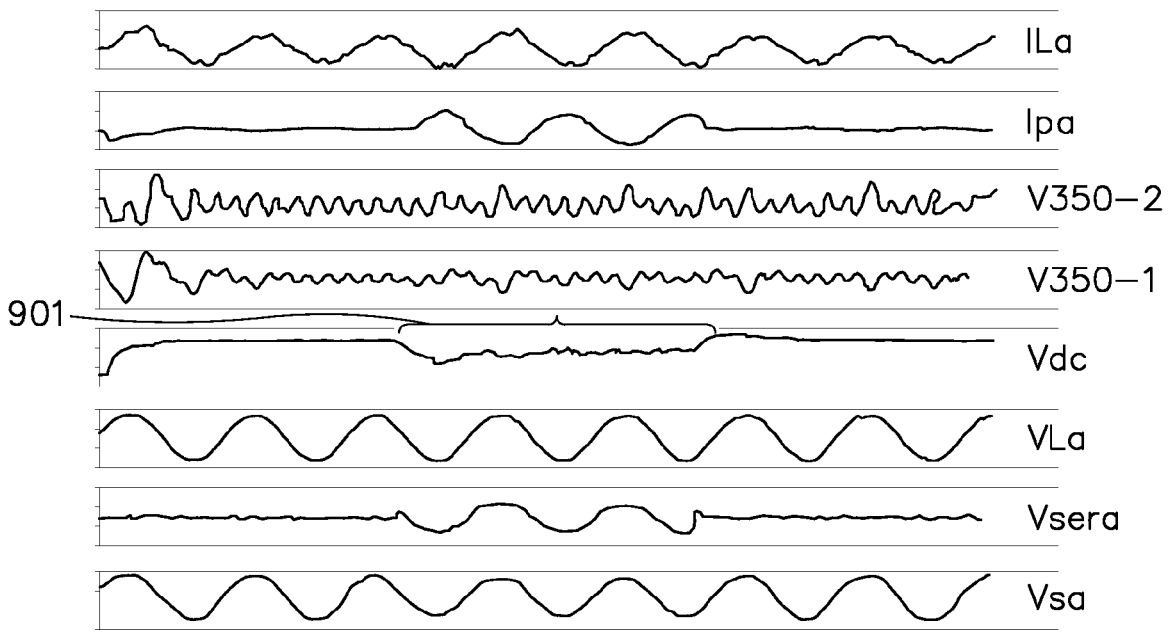
FIG. 9 is a plot of the system response of the power supply of FIG. 1 to a simulated AC input in a voltage sag condition.

FIG. 9 illustrates system response of the circuit shown in FIG. 1 to an AC input simulating a voltage sag condition 901. For this example, a voltage sag condition 901 is defined as one in which the AC input starts out at a nominal value, temporarily drops by 15%, then recovers to its nominal value. The waveforms in FIG. 9 show the response to one phase of the three-phase AC input. In the simulation waveforms, ILa is the current on the AC input line 102 in FIG. 1, while Ipa is the output current of the active rectifier 135 in FIG. 1. V350_1 and V350_2 are the DC outputs 145 in FIG. 1, corresponding to V1 and V2 up to Vn for n channels of DC outputs. Vdc is the regulator DC-link voltage, which is the voltage across the capacitor 117 in FIG. 1. VLa is the voltage at the primary side of the main transformer 120 in FIG. 1. Vsera is the inverter 140 in FIG. 1 output voltage, while Vsa is the voltage of AC input 102 in FIG. 1.

It can be seen that when there is a voltage sag condition 901 at the AC input, the inverter will generate an output Vsera that compensates for the variation in Vsa to make VLa constant. In this example, the sag condition 901 is revealed by the input voltage Vsa waveform in which two cycles in the center of the waveform have peak values less than the peak values of the waveform at either end. The current ILa is in phase with Vsera, which indicates the inverter is supplying real power to the AC input. The result is a drop in the DC bus, or Vdc, voltage. The active rectifier absorbs real power to keep Vdc constant after the initial drop in Vsa. FIG. 9 shows the active rectifier output current Ipa is 180 degrees out of phase with the AC input Vsa showing that the active rectifier is absorbing power. FIG. 9 also shows that the output DC channels V350_1 and V350_2 remain relatively constant during AC input sag condition 901.

Figure 10:
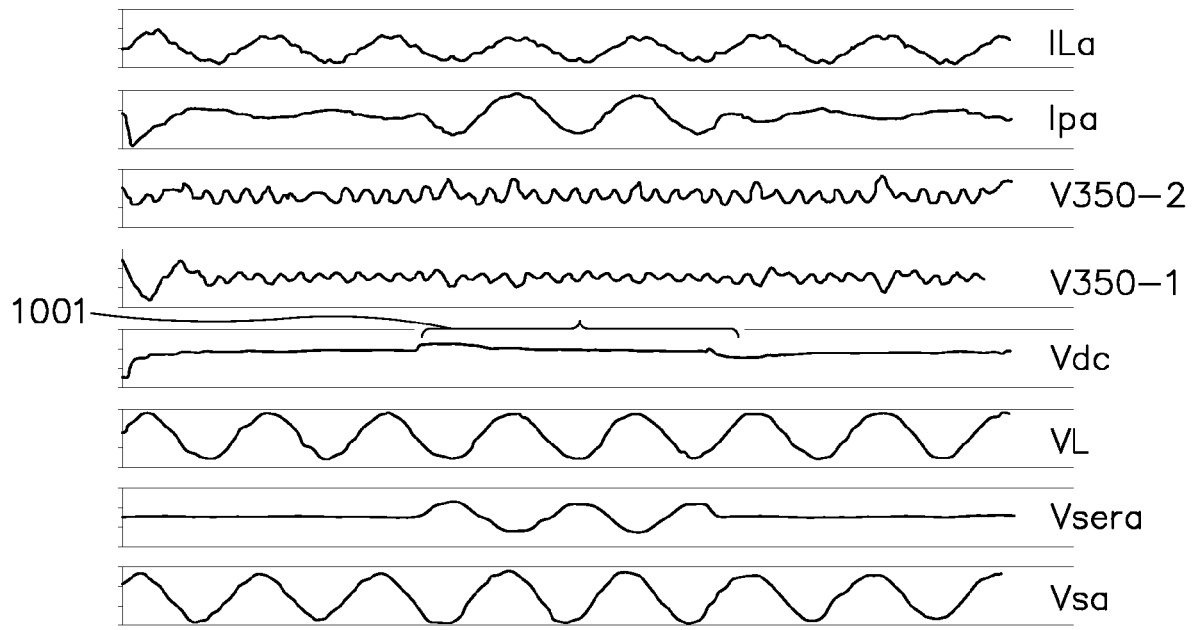
FIG. 10 is a plot of the system response of the power supply of FIG. 1 to a simulated AC input in a voltage swell condition.

FIG. 10 illustrates system response of the circuit shown in FIG. 1 to a simulated AC input simulating a voltage swell condition 1001. For this example, a voltage swell condition 1001 is defined as one in which the AC input starts out at a nominal value, then temporarily increases by 15% from its nominal value before recovering to its original value. In this example, the swell condition 1001 is revealed by the input voltage Vsa waveform in which two cycles in the center of the waveform have peak values greater than the peak values of the waveform at either end. In response, the inverter will generate an output Vsera that compensates for the variation in Vsa to make VL constant. The current ILa is 180 degrees out of phase with Vsera, which indicates that the inverter is absorbing real power from the AC input. This results in a voltage increase in the DC bus voltage, or Vdc. In this case, the active rectifier supplies power to make Vdc constant after the initial increase in Vsa. The rectifier output current Ipa is in phase with the AC input Vsa indicating that the rectifier is supplying power. FIG. 10 also shows that the output DC channels V350_1 and V350_2 remain relatively constant during AC input swell condition 1001.

In the embodiments disclosed in FIGS. 1 and 2, the PWM switches 140, 240 supply compensation voltages to an unregulated AC input power. In the examples described above with respect to FIGS. 9 and 10, the AC input power varied by as much as ±15%. In such a case, the PWM switches 140, 240 and the active rectifiers 135, 235 can function in their respective circuits with power ratings of just 30% of the incoming power. At this level, the components can supply compensating voltages of ±15% of the AC input. In MR systems, for example, where DC power to the gradient amplifiers is supplied by DC to DC resonant converters or buck converters, the power supply components would normally be rated at 100% of incoming power. As a result, resonant converters or buck converters generally need larger, more expensive components than those used in the disclosed embodiments of the invention. Additionally, both the transformers and rectifier diodes disclosed in embodiments of the invention can be low-frequency components, while rectifier diodes used in resonant converters are typically high-frequency diodes, making them more expensive than the diodes used in disclosed embodiments of the invention. Using an embodiment of the invention allows power supplies for MR gradient amplifiers to be assembled relatively inexpensively from lower cost power components, and lower cost low-frequency rectifier diodes.

Figure 11:
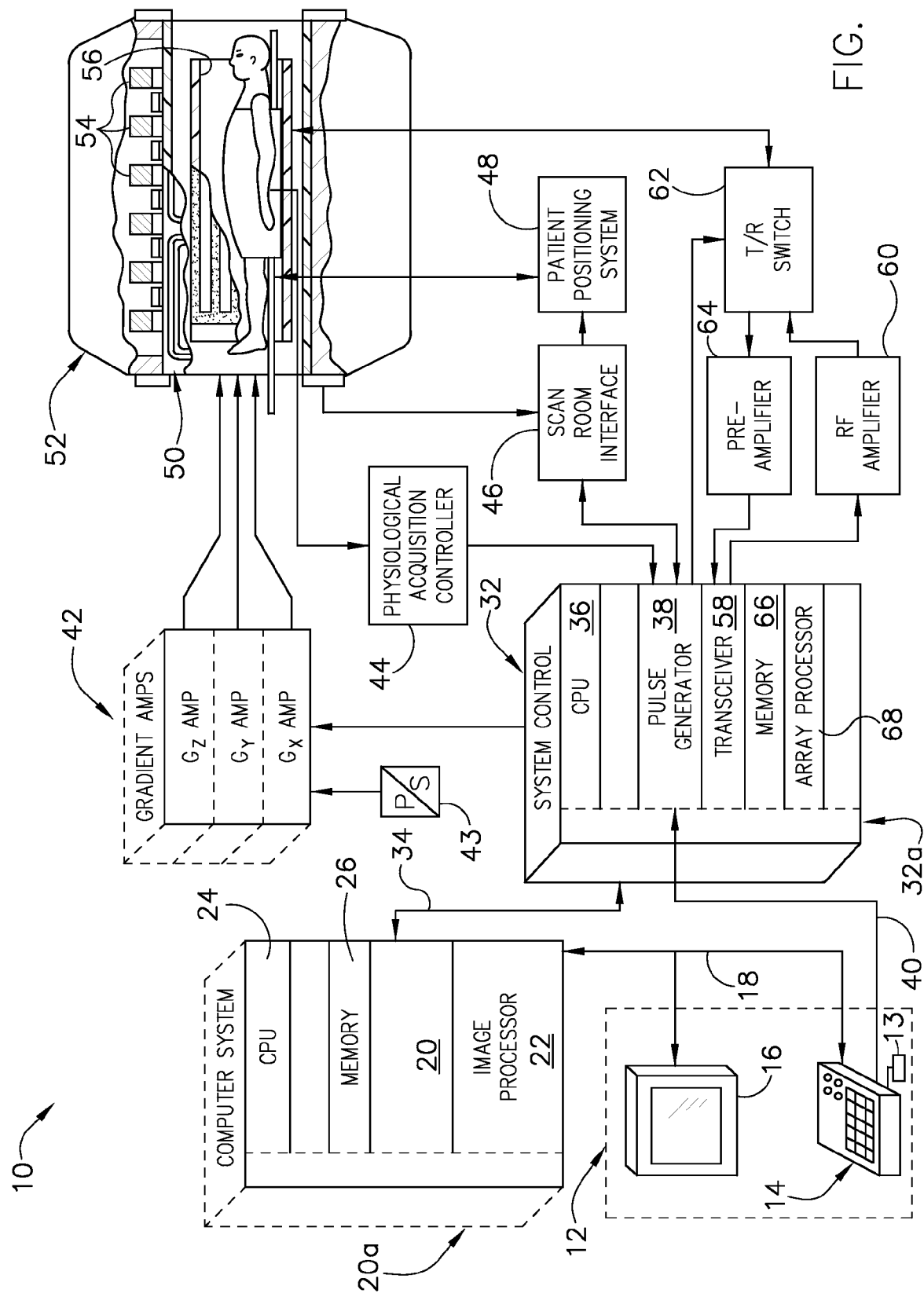
FIG. 11 is a schematic block diagram of an MR imaging system incorporating an embodiment of the invention.

FIG. 11 illustrates a magnetic resonance (MR) imaging system incorporating an embodiment of the invention to supply power to gradient amplifiers. The major components of an exemplary magnetic resonance imaging (MRI) system 10 incorporating embodiments of the invention are shown. The operation of the system is controlled from an operator console 12 which includes a keyboard or other input device 13, a control panel 14, and a display screen 16. The console 12 communicates through a link 18 with a separate computer system 20 that enables an operator to control the production and display of images on the display screen 16. The computer system 20 includes a number of modules which communicate with each other through a backplane 20a. These include an image processor module 22, a CPU module 24 and a memory module 26 that may include a frame buffer for storing image data arrays. The computer system 20 is linked to archival media devices, permanent or back up memory or a network for storage of image data and programs, and communicates with a separate system control 32 through a high speed serial link 34. The input device 13 can include a mouse, joystick, keyboard, track ball, touch activated screen, light wand, voice control, or any similar or equivalent input device, and may be used for interactive geometry prescription.

The system control 32 includes a set of modules connected together by a backplane 32a. These include a CPU module 36 and a pulse generator module 38 which connects to the operator console 12 through a serial link 40. It is through link 40 that the system control 32 receives commands from the operator to indicate the scan sequence that is to be performed. The pulse generator module 38 operates the system components to carry out the desired scan sequence and produces data which indicates the timing, strength and shape of the RF pulses produced, and the timing and length of the data acquisition window. The pulse generator module 38 connects to a set of gradient amplifiers 42, to indicate the timing and shape of the gradient pulses that are produced during the scan. A power supply 43 with a plurality of DC outputs is coupled to and provides power to gradient amplifiers 42. According to an embodiment of the invention, power supply 43 may be constructed from embodiments of the invention as described above such as, for example, the isolated power supply described with respect to FIG. 1. Accordingly, MR system 10 may benefit from increased cost savings. The pulse generator module 38 can also receive patient data from a physiological acquisition controller 44 that receives signals from a number of different sensors connected to the patient, such as ECG signals from electrodes attached to the patient. And finally, the pulse generator module 38 connects to a scan room interface circuit 46 which receives signals from various sensors associated with the condition of the patient and the magnet system. It is also through the scan room interface circuit 46 that a patient positioning system 48 receives commands to move the patient to the desired position for the scan.

The gradient waveforms produced by the pulse generator module 38 are applied to the gradient amplifier system 42 having Gx, Gy, and Gz amplifiers. Each gradient amplifier excites a corresponding physical gradient coil in a gradient coil assembly generally designated 50 to produce the magnetic field gradients used for spatially encoding acquired signals. The gradient coil assembly 50 forms part of a magnet assembly 52 which includes a polarizing magnet 54 and a whole-body RF coil 56. A transceiver module 58 in the system control 32 produces pulses which are amplified by an RF amplifier 60 and coupled to the RF coil 56 by a transmit/receive switch 62. The resulting signals emitted by the excited nuclei in the patient may be sensed by the same RF coil 56 and coupled through the transmit/receive switch 62 to a preamplifier 64. The amplified MR signals are demodulated, filtered, and digitized in the receiver section of the transceiver 58. The transmit/receive switch 62 is controlled by a signal from the pulse generator module 38 to electrically connect the RF amplifier 60 to the coil 56 during the transmit mode and to connect the preamplifier 64 to the coil 56 during the receive mode. The transmit/receive switch 62 can also enable a separate RF coil (for example, a surface coil) to be used in either the transmit or receive mode.

The MR signals picked up by the RF coil 56 are digitized by the transceiver module 58 and transferred to a memory module 66 in the system control 32. A scan is complete when an array of raw k-space data has been acquired in the memory module 66. This raw k-space data is rearranged into separate k-space data arrays for each image to be reconstructed, and each of these is input to an array processor 68 which operates to Fourier transform the data into an array of image data. This image data is conveyed through the serial link 34 to the computer system 20 where it is stored in memory. In response to commands received from the operator console 12, this image data may be archived in long term storage or it may be further processed by the image processor 22 and conveyed to the operator console 12 and presented on the display 16.

While the specification discloses embodiments of the invention relating to gradient amplifiers in MR imaging systems, one skilled in the art will recognize that embodiments of the invention may be useful in any application requiring multiple DC outputs at the same time that are isolated and stable (i.e., with little variation). For example, such technology might be found in motor drives with cascade topology.

According to one embodiment of the invention, a power supply having an input, wherein the power supply includes a multi-winding transformer having an input and a plurality of outputs, and a plurality of rectifiers to provide a plurality of DC output voltages, wherein each rectifier is coupled to an output of the multi-winding transformer. The power supply further includes a regulator circuit coupled between the transformer input and one of the transformer outputs, and configured to regulate an input voltage to the multi-winding transformer to minimize a variance of each rectifier DC output voltage.

In accordance with another embodiment of the invention, an MRI apparatus includes a magnetic resonance imaging (MRI) system having a plurality of gradient coils positioned about a bore of a magnet, a plurality of gradient amplifiers, an RF transceiver system, an RF switch controlled by a pulse module to transmit RF signals to an RF coil assembly to acquire MR images, and a DC power supply having an input and coupled to the plurality of gradient amplifiers. The power supply includes a transformer having a primary winding and a plurality of secondary windings, and a rectifier array coupled to at least a portion of the plurality of secondary windings and configured to provide a plurality of DC outputs therefrom. The power supply further includes a control circuit electrically coupled between the primary winding and one of the secondary windings, and configured to regulate an input voltage to the primary winding to minimize a variance of each DC output.

Yet another embodiment of the invention includes a method of manufacturing a power supply which includes providing a connection and electrical line for an AC input, coupling the AC input to a multi-winding transformer having a plurality of outputs, and assembling a plurality of rectifiers to the multi-winding transformer wherein each rectifier is coupled to an output of the multi-winding transformer. The method further includes assembling a regulator circuit coupled to one of the transformer outputs, and coupling the regulator circuit to the electrical line for the AC input.

The invention has been described in terms of the preferred embodiment, and it is recognized that equivalents, alternatives, and modifications, aside from those expressly stated, are possible and within the scope of the appending claims.

What is claimed is:

1. A power supply having an input, the power supply comprising:
   a multi-winding transformer having an input and a plurality of outputs;
   a plurality of rectifiers to provide a plurality of DC output voltages, wherein each rectifier is coupled to an output of the multi-winding transformer; and
   a regulator circuit coupled between the transformer input and one of the outputs, and configured to regulate an input voltage to the multi-winding transformer to minimize a variance of each rectifier DC output voltage, wherein the regulator circuit comprises:
   an inductive filter coupled to an output of the transformer;
   an active rectifier coupled to the inductive filter;
   an inverter coupled to the active rectifier;
   a capacitor connected across an output of the active rectifier;
   an LC filter coupled to the inverter; and
   a bypass protection circuit coupled between the LC filter and the power supply input.

2. The power supply of claim 1 wherein the inverter comprises a pulse-width-modulated inverter.

3. The power supply of claim 1 wherein the inductive filter comprises leakage inductance from the multi-winding transformer.

4. The power supply of claim 1 wherein the regulator circuit further comprises a second transformer to electrically isolate the power supply input from the plurality of transformer outputs.

5. The power supply of claim 1 wherein the power supply is configured to accept a three-phase AC input voltage.

6. The power supply of claim 1 wherein the power supply is configured to accept a single-phase AC input voltage.

7. The power supply of claim 1 wherein the regulator circuit is further configured to add a compensating voltage to the input voltage to the multi-winding transformer.

8. An MRI apparatus comprising:
a magnetic resonance imaging (MRI) system having a plurality of gradient coils positioned about a bore of a magnet, a plurality of gradient amplifiers, an RF transceiver system, an RF switch controlled by a pulse module to transmit RF signals to an RF coil assembly to acquire MR images, a DC power supply having an input and coupled to the plurality of gradient amplifiers, the power supply comprising:
a transformer having a primary winding and a plurality of secondary windings;
a rectifier array coupled to at least a portion of the plurality of secondary windings and configured to provide a plurality of DC outputs therefrom; and
a control circuit electrically coupled between the primary winding and one of the secondary windings, and configured to regulate an input voltage to the primary winding to minimize a variance of each DC output, wherein the control circuit comprises:
an inductive filter coupled to a secondary winding of the transformer;
an active rectifier coupled to the inductive filter;
an inverter coupled to the active rectifier;
a capacitor connected across an output of the active rectifier;
an LC filter coupled to the inverter; and
a bypass protection circuit coupled between the LC filter and the power supply input.

9. The MRI apparatus of claim 8 wherein the input voltage to the primary winding is regulated by the addition of a compensating voltage to the input voltage to the primary winding of the transformer.

10. The MRI apparatus of claim 8 wherein the inverter comprises a pulse-width-modulated inverter.

11. The MRI apparatus of claim 8 wherein the control circuit further comprises a second transformer to electrically isolate the power supply input from the plurality of secondary windings.

12. The MRI apparatus of claim 8 wherein the power supply is further configured to accept a three-phase AC input voltage.

13. A method of manufacturing a power supply comprising:
providing a connection and electrical line for an AC input;
coupling the AC input to a multi-winding transformer having a plurality of outputs;
assembling a plurality of rectifiers to the multi-winding transformer wherein each rectifier is coupled to an output of the multi-winding transformer;
assembling a regulator circuit coupled to one of the transformer outputs; and
coupling the regulator circuit to the electrical line for the AC input, wherein assembly of the regulator circuit comprises:
coupling an active rectifier to an output of the multi-winding transformer;
coupling an inverter to the active rectifier;
connecting a capacitor across an output of the active rectifier;
coupling an LC filter to the inverter; and
coupling a bypass protection circuit between the LC filter and the power supply input.

14. The method of claim 13 wherein providing a connection and electrical line for an AC input comprises providing a three-phase connection and electrical line.

15. The method of claim 13 wherein the inverter comprises a pulse-width-modulated inverter.

16. The method of claim 13 further comprising coupling a second transformer between the bypass protection circuit and the power supply input.

17. The method of claim 13 further comprising coupling an inductive filter between the output of the multi-winding transformer and the active rectifier.

* * * * *